United States Patent [19]

Radtke

[11] Patent Number: 4,589,038
[45] Date of Patent: May 13, 1986

[54] POSITION SENSOR

[75] Inventor: Ernst-Rudolf Radtke, Erlensee, Fed. Rep. of Germany

[73] Assignee: Honeywell GmbH, Fed. Rep. of Germany

[21] Appl. No.: 625,748

[22] Filed: Jun. 28, 1984

[30] Foreign Application Priority Data

Jul. 14, 1983 [DE] Fed. Rep. of Germany ....... 3325353

[51] Int. Cl.$^4$ ............................................. G01B 7/02
[52] U.S. Cl. ..................................... 360/79; 318/653; 324/206; 360/72.2; 360/113
[58] Field of Search ................... 73/DIG. 2, DIG. 3; 235/449, 476; 318/647, 653; 324/206, 213, 252; 360/72.2, 74.4, 79, 113

[56] References Cited

U.S. PATENT DOCUMENTS

| | | | |
|---|---|---|---|
| 3,493,694 | 2/1970 | Hunt | 360/113 |
| 4,001,890 | 1/1977 | Kayser | 360/113 |
| 4,044,392 | 8/1977 | Brock et al. | 360/113 |
| 4,152,736 | 5/1979 | Jansen et al. | 360/78 |
| 4,424,541 | 1/1984 | Koinuma et al. | 360/75 |
| 4,485,414 | 11/1984 | Baker | 360/10.3 |

OTHER PUBLICATIONS

IBM Technical Disclosure Bulletin, vol. 15, No. 4, Sep. 1972, pp. 1320–1321, Servo Control of Multielement Magnetic Heads, Zimmermann et al.

Primary Examiner—George G. Stellar
Attorney, Agent, or Firm—Charles J. Ungemach

[57] ABSTRACT

Figure 1:
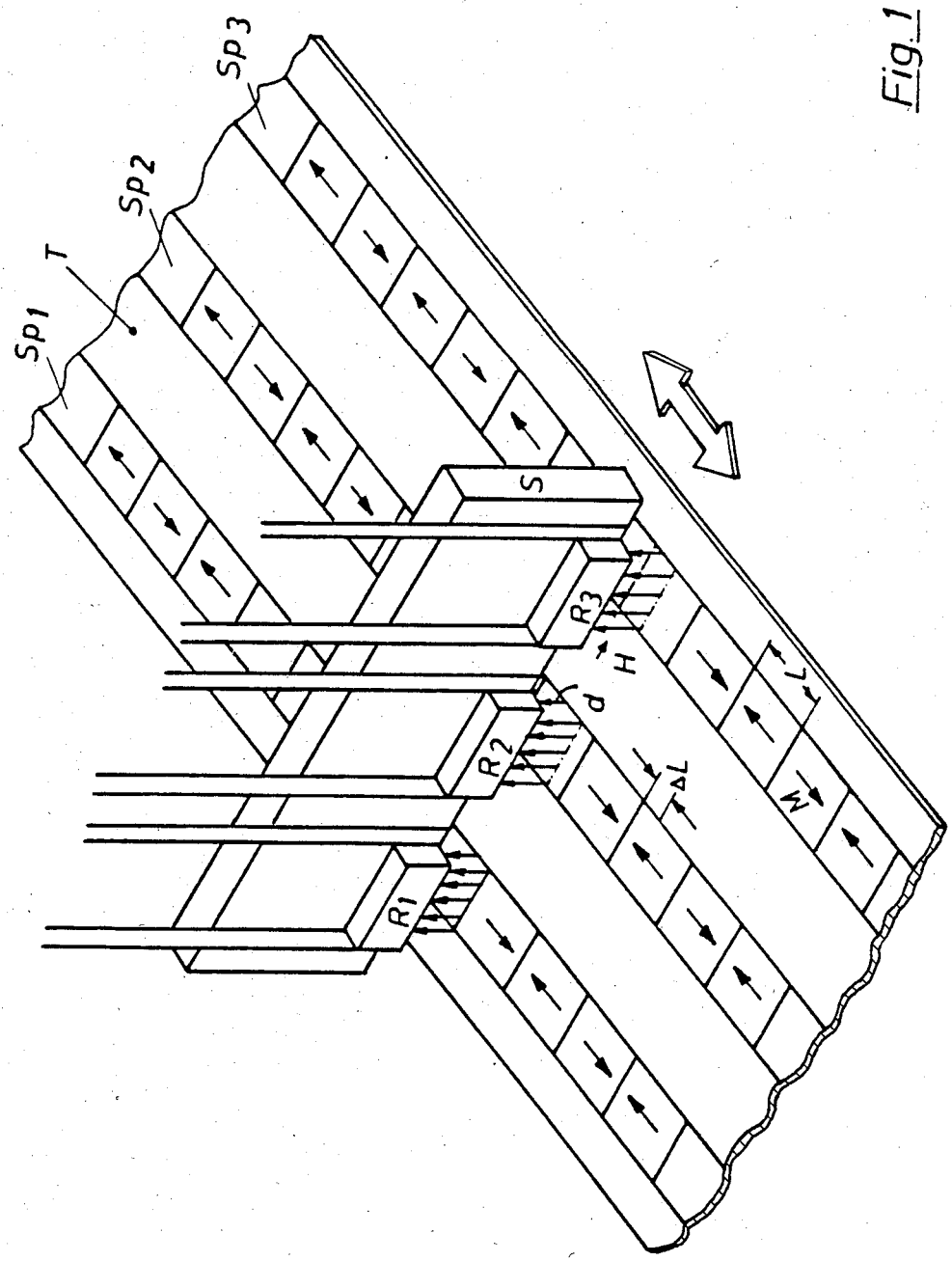

A position sensor comprises n tracks ($Sp_1$, $Sp_2$, $Sp_3$) on a carrier (T) which are provided with magnetizations of a length L and of alternate polarity. The tracks are phase-shifted with respect to each other by $\Delta L = L/n$. A sensor head (S) comprises Permalloy-resistors ($R_1$, $R_2$, $R_3$) above each track ($Sp_1$, $Sp_2$, $Sp_3$) whereat the maximum distance d of the Permalloy-resistors ($R_1$, $R_2$, $R_3$) from the tracks does not exceed essentially the length L (FIG. 1).

11 Claims, 7 Drawing Figures $M = M_0 \sin \pi X/L$

POSITION SENSOR

The present invention relates to an apparatus for sensing the position of a movable part according to the preamble of claim 1. Such position sensors often are irrevocable prerequisites for the steering and control of a plurality of processes.

Digital position transmitters are of particular importance due to their relative minor susceptibility to troubles with respect to intensity alterations of the sensed signals and due to the possibility to match them directly to a digital evaluation electronics circuit. Optoelectrical angle encoders as well as translation encoders are well-known in the prior art. Their operation principle consists in indication of the position as an electrical signal by means of a transparent/opaque mask and related sensing elements whereat the signal forms either directly a binary combination, this means an absolute signal or forms an addition of increments, this means an incremental signal. Such optical position sensors show the disadvantage that they get functionally unoperable at interaction with dust, opaque liquids, gases or vapours. Even with an encased design this susceptibility to troubles in particular within a rude industrial environment cannot be completely eliminated.

Figure 4:
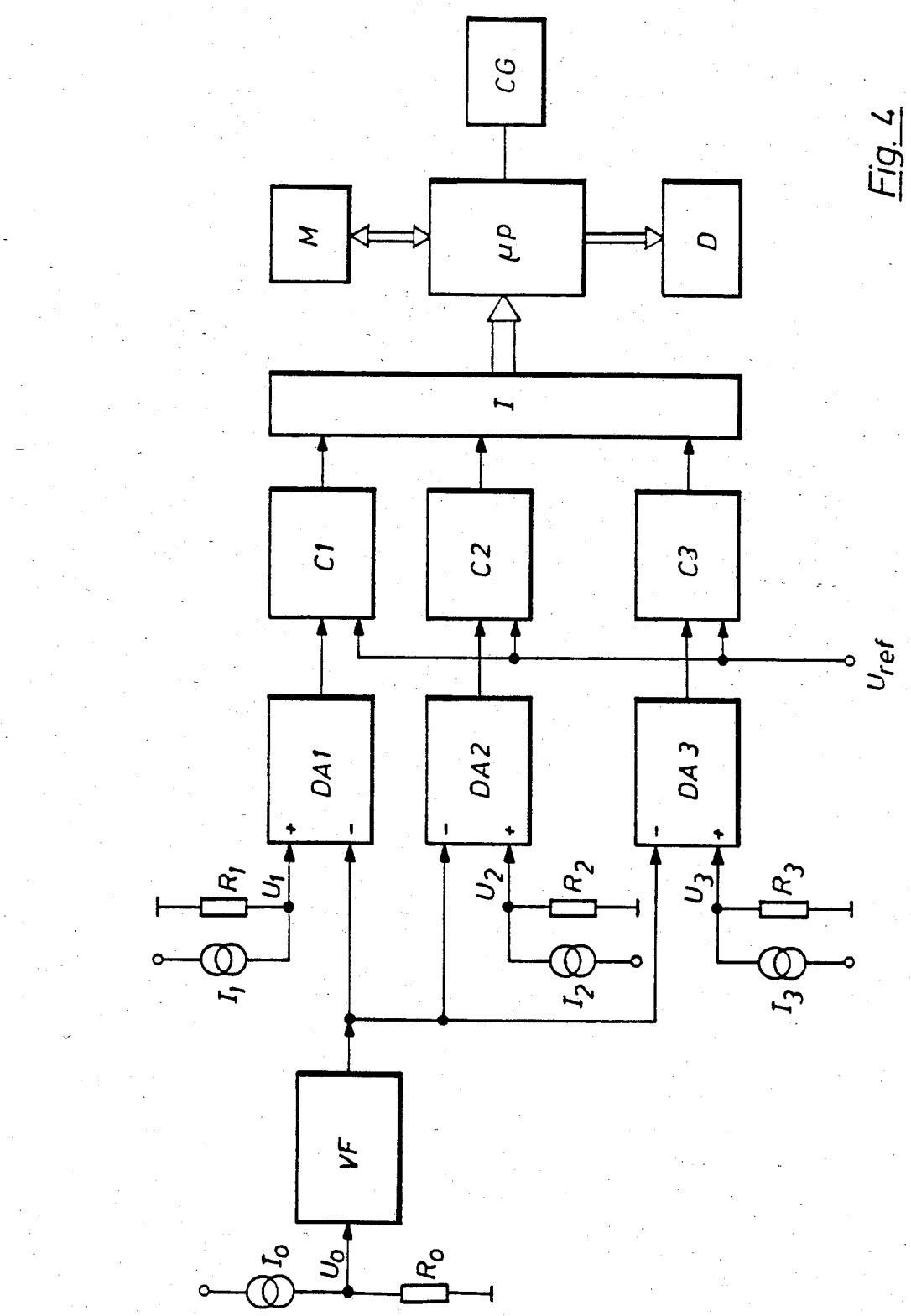

At a magnetic position sensor the transmission of liquids, gases an vapours basically does not play a roll since a magnetic field distribution to be sensed is not influenced by such agents. The same is true with respect to non-ferromagnetic dust. Such a magnetic position sensor for instance is known from German published patent application DE-OS 32 18 298 (FIG. 4). There a mobable part is provided with magnetizations of alternate polarity which are sensed by means of a hall-sensor or a magnetoresistor respectively and are converted into electrical signals. If one uses resistors susceptible to magnetic field then with a tangential magnetization it results due to the laws of magnetostatic that for sensing the change of the magnetic field the resistor must have a distance from the track to be sensed which should not exceed excessively the length of the magnetic path element. If a high resolution is requested and the magnetic path element is accordingly short then a distance of the magnetoresistor from the encoded track results at which coarse dust particles or an extension due to temperature changes may result in distortions.

It is therefore the object of the present invention to provide a remedial action with this respect this means to guarantee a sufficient distance of the sensor from the encoded track even if high resolution is requested. This object is achieved according to the invention as claimed in claim 1. Further advantageous embodiments of the invention may be taken from the subclaims.

From the German published patent application DE-OS 31 26 806 it is already known to provide a plurality of tracks with respect to an encoder which uses resistors susceptible to the magnetic field. However with the known incremental encoder use of such multiple tracks is only made for discrimination of the direction whereat it is commonly sufficient to provide two tracks phase shifted by a half graduation. Only at the use of magnetoresistive sensors having a quadratic characteristic the known device provides three tracks. In contrast to this the purpose of the present invention is to provide a sufficient distance of the sensor from the part bearing the coded tracks by the provision of a plurality of tracks when a certain resolution is requested. This allows the use of the apparatus within a rude industrial environment. At the same time a prerequisite is achieved for cheap manufacturing of the sensor chip since grinding and lapping of the one side of the sensor-chip is eliminated at which side the magnetoresistive sensor elements are provided which sense the magnetic field array.

This known encoder further makes use of an evaluation circuit for the signals provided by the resistors susceptible to the magnetic field which circuit consists of a voltage divider with compensation resistors each being connected parallel. This known evaluation circuit as well as the often used bridge circuit shows the disadvantage that the temperature coefficient of the magnetoresistor R only can be compensated by the trade-off of a temperature coefficient of a resistor alteration $\delta R/R$ susceptible to the magnetic field. It can be shown that this temperature coefficient of $\delta R/R$ by about 30% is greater than the temperatur coefficient or R alone so that the measuring accuracy of the encoder even becomes worse. Furtheron the voltage divider circuit or the bridge circuit respectively shows the disadvantage that a relatively big number of resistors is needed in order to implement the circuit. If one intends to integrate the circuit on a silicon chip than the resistors occupy a relative large chip area which is a disadvantage with respect to costs. Finally it results in a reduce of the magnetoresistive sensitivity if one intends to achieve a high magnetoresistor value by reducing of the film thickness. This is due to the fact that $\delta R$ is independent of the film thickness.

All those shortcomings are eliminated by a circuit device from which the position sensor according to the invention makes use.

Within the scope of the present invention it was further stated that the behavior of the magnetic field intensity at the ends of the magnetic tracks shows heavy irregularities so that no exact measuring is achieved when sensing this area of the position sensor. Therefore with preference only the central area of the magnetic tracks is sensed by means of the sensor head according to the present invention.

Figure 2A:
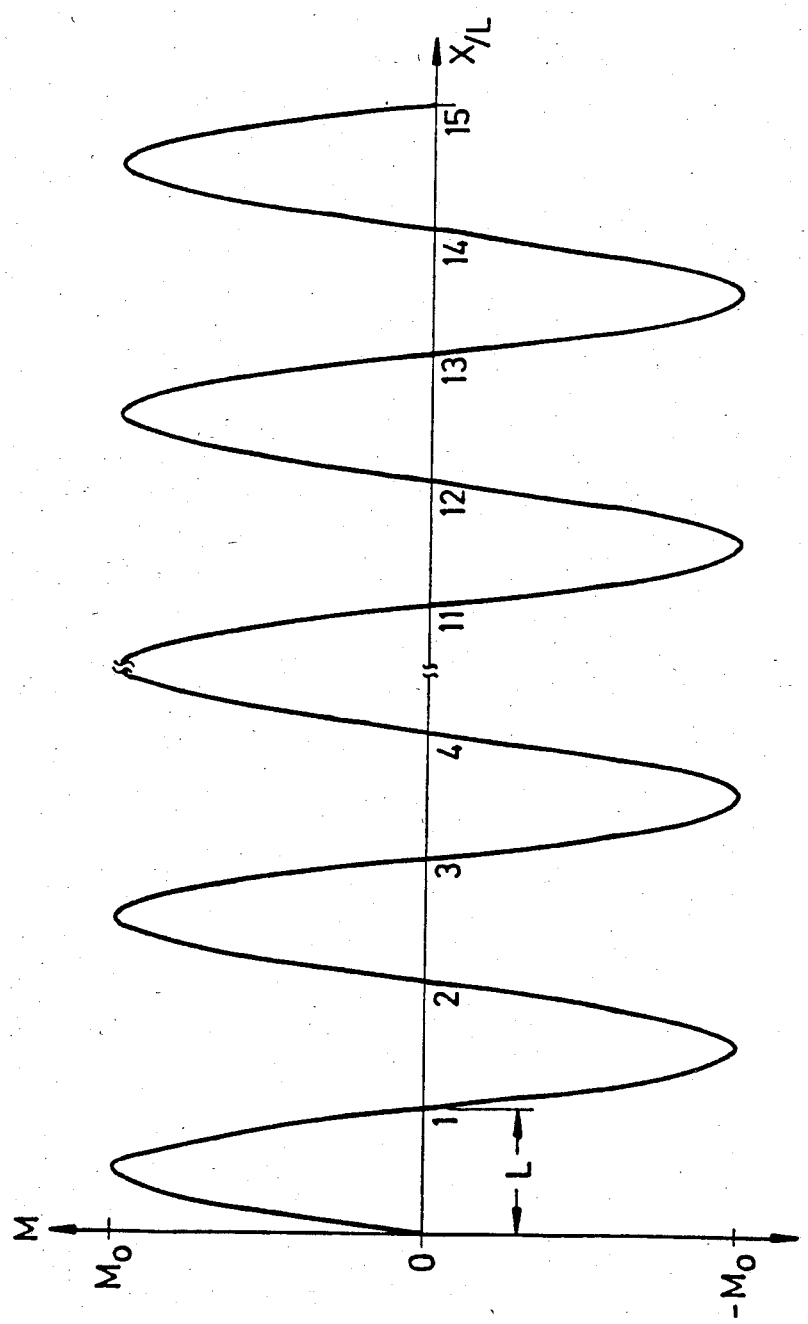
Figure 2B:
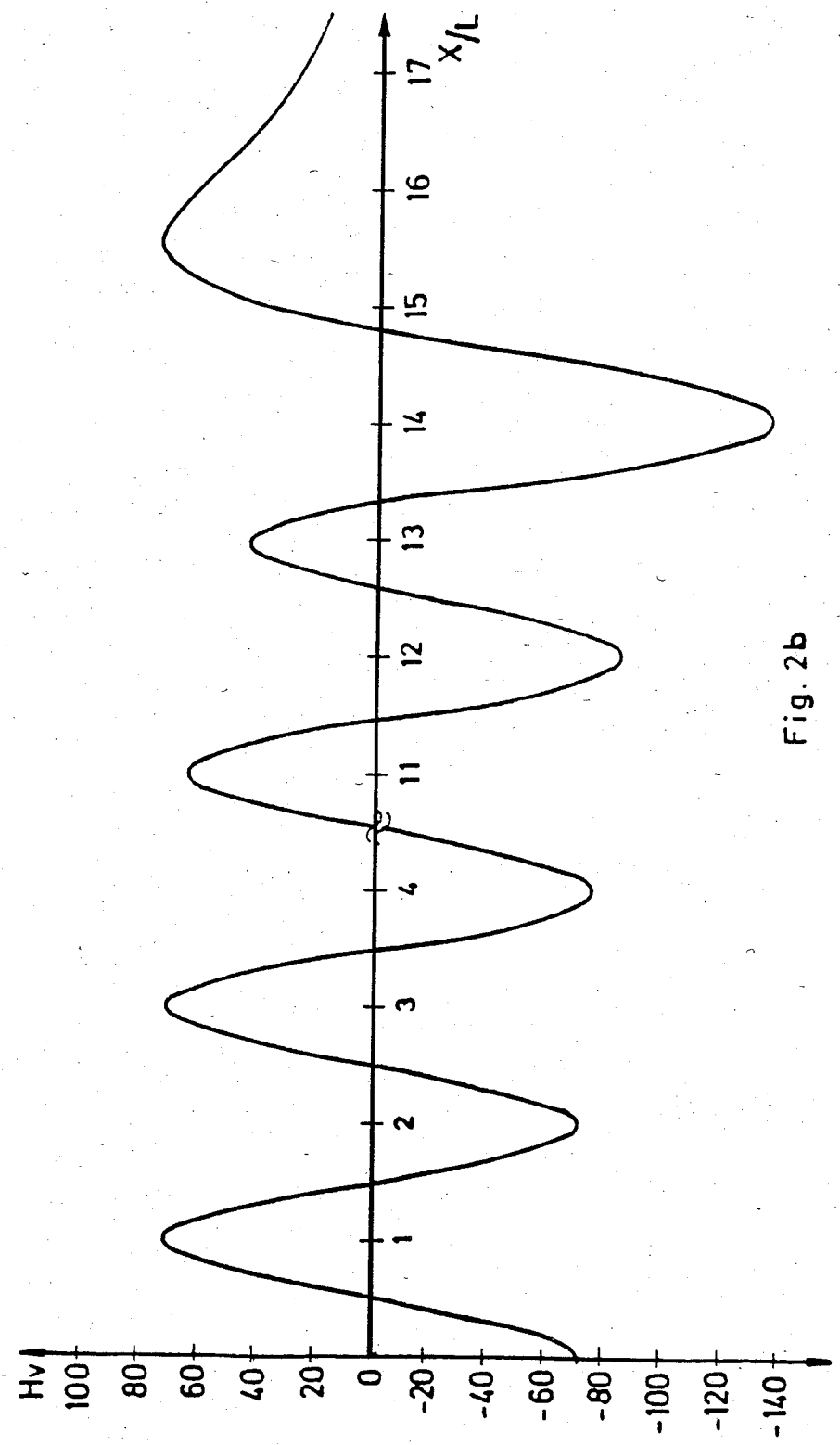
Figure 2C:
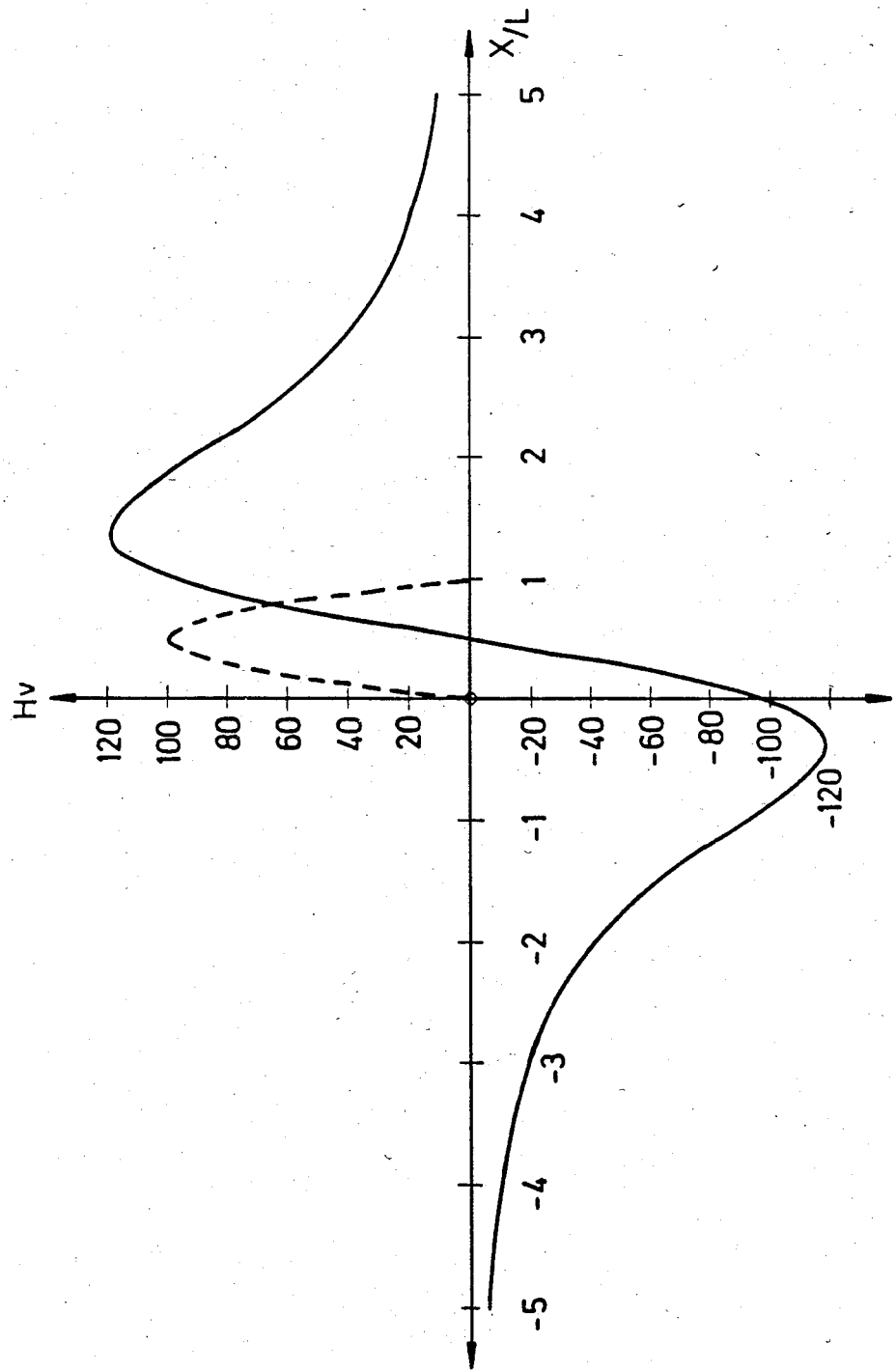
Figure 3:
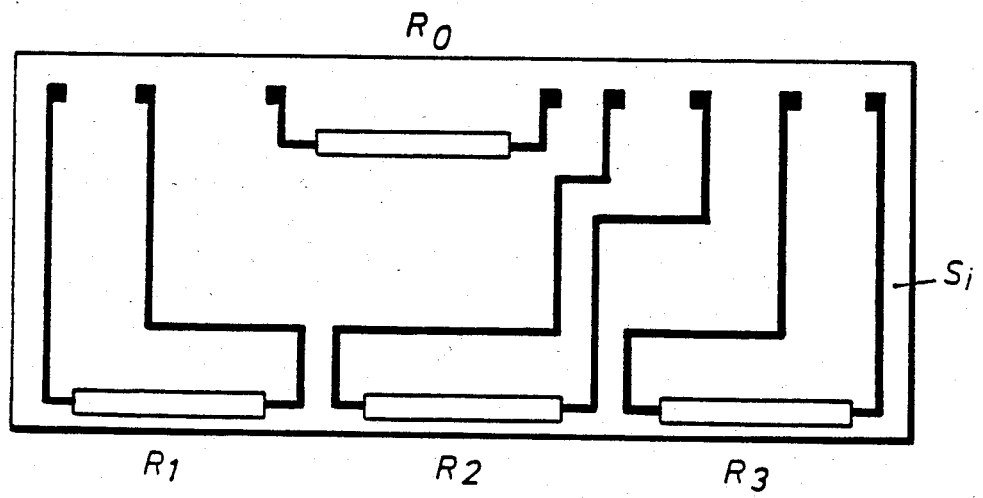

Under reference to an embodiment shown in the figures of the attached drawing in the following the invention shall be further explained. It shows:

FIG. 1 a perspective view of the position sensor according to the invention;

FIG. 2a the behavior of sine-shaped normalized magnetizations of a track with respect to relative path units;

FIG. 2b the behavior of the resulting vertical and normalized magnetic field intensity with respect to relative path units;

FIG. 2c the behavior of the vertical and normalized magnetic field intensity for a single sine-shaped magnetized path element (dotted curve) with respect to relative path units;

FIG. 3 a sensor element according to the invention;

FIG. 4 an evaluation circuit connected to the sensor element; and

Figure 5:
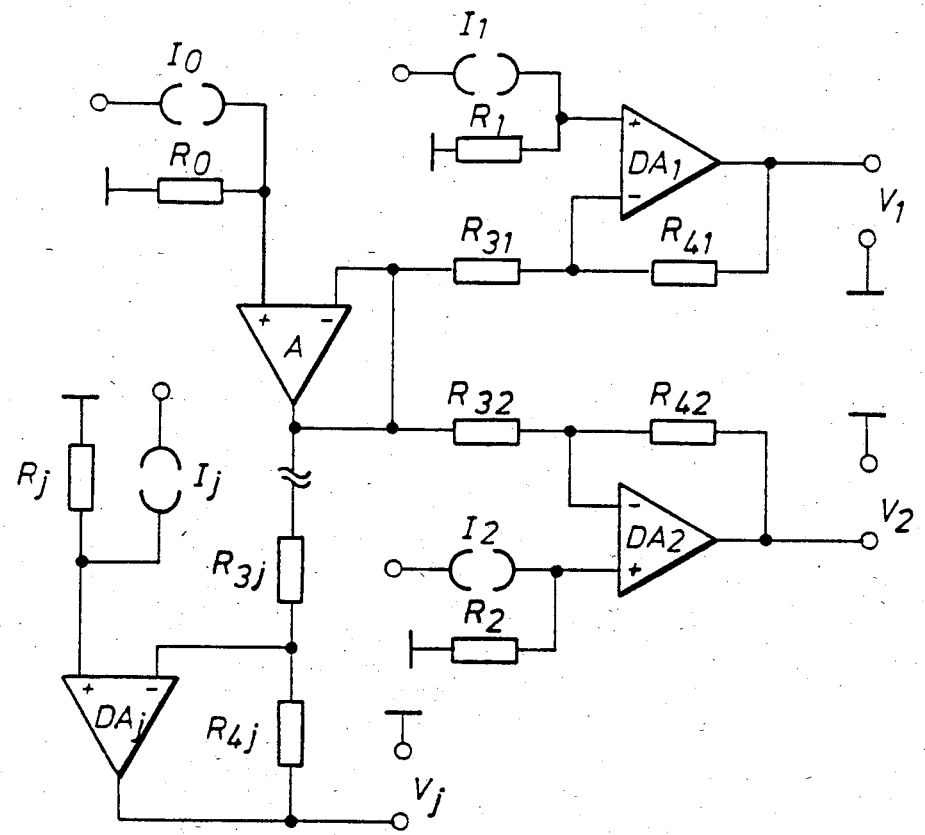

FIG. 5 further details of the input section of the evaluation circuit according to FIG. 4.

According to FIG. 1 on a carrier T which is appropriate to be permanently magnetized three tracks $Sp_1$, $Sp_2$ and $Sp_3$ are provided by means of a magnetizing head with those tracks each being alternately and oppositely magnetized. This magnetization may be achieved in the same manner as it is for instance known from magnetic tapes or program cards of pocket calculators.

Each track $Sp_1$, $Sp_2$ and $Sp_3$ is divided in magnetized elements of the length L by magnetization tangential to a surface of the carrier T whereat the magnetization $\vec{M}$ from one element to an adjacent element has the same value but an opposite direction. As may be taken from FIG. 1 in the present example with three tracks the magnetized elements of adjacent tracks are displaced by $\Delta L = L/3$. The displacement of the tracks with respect to each other allows to discriminate the direction with respect to the movement of the movable part T; however to this end two phase shifted tracks would be sufficient. However the primary purpose of the provision of a plurality of magnetic tracks phase shifted with respect to each other is to be seen in the improvement of the resolution with the sensor S at the same time having a sufficient distance from the magnetic tracks $Sp_1$, $Sp_2$ and $Sp_3$. The sensor S consists of a silicone substrate onto which Permalloy-resistors $R_1$, $R_2$ and $R_3$ are vapourized with those resistors having a distance from each other which is matched to the distance of the magnetic tracks from each other.

The implementation of Permalloy-resistors $R_1$, $R_2$ and $R_3$ having a distance from the magnetic tracks $Sp_1$, $SP_2$ and $SP_3$ which is relatively free of problems and which results at the same time in a high resolution of the position sensor is achieved by a multitrack encoding according to the following principle.

According to the laws of magnetostatic it may be shown that the magnetic field amplitude to be measured shows the required value in a distance range $0 < d \leqslant L$, whereat d corresponds to the distance of the Permalloy-resistors from the carrier T provided with the magnetic tracks and whereat L represents the length of a magnetized element. If now the smallest path increment to be measured is $\Delta L$ and the distance d exceeds importantly this value $\Delta L$ then both values are incompatible if one track is provided since the above indicated requirement is not satisfied. However if one uses n tracks with $n = d/\Delta L$ and $L = n \cdot \Delta L$, whereat adjacent magnetized tracks locally are displaced by $\Delta L$ then the above indicated requirement is satisfied and the desired distance d at given $\Delta L$ is guaranteed. FIG. 1 shows this principle with respect to three tracks whereat a displacement of the tracks by $\Delta L = L/3$ results.

The magnetization array of the magnetic tracks $Sp_1$, $Sp_2$ and $Sp_3$ shows a sine-shape behavior as shown in FIG. 2a with respect to relative path units X/L. In the same manner FIG. 2b shows the behavior of the vertical magnetic field intensity $H_v$ with respect to relative path units X/L, whereat with respect to both figures departing from the centre of the magnetic track only the behavior for one half of the magnetic track is shown. One recognizes that the vertical magnetic field intensity $H_v$ only within the center area of the magnetic track shows a relatively regular behavior whereas towards the end of the magnetic track the behavior of the field intensity is heavy distorted with respect to amplitude and periodicity. Therefore this area must be excluded as measuring range at an accurate position sensor. The reasons for such an irregular behavior of the vertical magnetic field intensity $H_v$ may be taken from FIG. 2c where the behavior of the vertical magnetic field intensity $H_v$ is shown by full lines and where this behavior is caused by the sine-shaped magnetization of an single element as shown in dotted lines. Due to this behavior only in the central range of the magnetic track a regular sine-shaped behavior of the field intensity can be found whereas toward the ends of the magnetic tracks the behavior of the field intensity equals more and more to the behavior of a single element.

The Permalloy-resistors $R_1$, $R_2$ and $R_3$ according to FIGS. 1 and 3 which are vapourized on the silicone substrate $S_i$ by the influence of the magnetic field $\vec{H}$ show an alteration of their magnetization vectors $\vec{M}$, whereat this magnetization vector from its privileged direction which may coincide with the direction of the current is rotated by an angle $\phi$. As known from the scientific literature this results in an alteration of the resistor value according to the following equation $$R(H) = R(H=0) - \Delta R_{max} \cdot \cos^2 \phi(H)$$

Herewith $\Delta R_{max}/R(H=0)$ is a matter constant indicated by the manufacturers in the range of 0,02. This alteration of the resistor value is used for sensing the magnetic field distribution. Often it may be appropriate to shift the working point of the Permalloy-resistor into a certain point of its characteristic by means of an additional magnetic field. This additional field at one hand may be produced by integrated means on the sensor chip with that means comprising firstly an isolating layer and then an appropriately dimensioned permanent magnetic layer both vapourized above the Permalloy-resistor. On the other hand the additional field may be produced on the chip by providing a planar conductor above and parallel to the Permalloy-resistor which is separated from the Permalloy-resistor by means of an isolating layer of some hundred Angström. If a current flows through this conductor a magnetic field is produced at the location of the Permalloy-resistor. By means of variation of a current value the working point may be continuously shifted along the characteristic which may be of advantage in some applications.

The literature shows a further possibility namely the Barber-Pol-Configuration.

Of important influence with respect to accuracy and technical feasibility of the present position sensor besides the above discussed distance of the sensor head from the magnetic tracks are the distortions from a regular field behavior caused by finite length of the magnetized track which was already discussed with respect to FIG. 2b. With a requested accuracy those distortions from the perfect regular behavior of the magnetic field intensity may be limited to a minimum by providing magnetized tracks which are geometrically longer as necessary for their evaluation whereat the sensor head only senses the central area which satisfies the requirements. The number of necessary magnetized elements of the length L with respect to each track and therefore the total length may be calculated by the equations of the magnetostatic.

According to FIG. 3 besides the Permalloy-resistors $R_1$, $R_2$ and $R_3$ for sensing the magnetic tracks a further Permalloy-resistor $R_0$ is arranged with such a distance from the magnetic tracks that it is practically not influenced by those tracks. The Permalloy-resistor $R_0$ serves for compensation of weak homogeneous magnetic distortion fields as well as for compensation of the temperature drift of the Permalloy-resistors $R_1$, $R_2$ and $R_3$, which shall be further explained below with respect to FIG. 5.

According to FIG. 4 an evaluation electronics is shown, which is connected to the sensor head according to FIG. 3 or may be integrated to an large extend on the silicon substrate. Associated with all Permalloy-resistors $R_0$-$R_3$ are current sources $I_0$-$I_3$ which inject load-independent currents into the related magnetoresistors. Herewith voltage drops $U_0$–$U_3$ arise whereat the voltages $U_1$–$U_3$ each are applied to the positive input of an associated operational amplifier $DA_1$–$DA_3$. The voltage $U_0$ is fed to the negative inputs of the operational amplifiers $DA_1$–$DA_3$ via a voltage follower VF. In this way a temperature drift as well as the influence of a magnetic distortion field is compensated. The output signals of the operational amplifiers $DA_1$–$DA_3$ are compared to a reference voltage $U_{ref}$ within comparators $C_1$–$C_3$ and the output signals of the comparators $C_1$–$C_3$ are applied to microprocessor μp via a common interface I with that microprocessor being connected to a clock generator CG and a memory M as well as to a display D for outputting of the calculated results.

At the outputs of the comparators $C_1$–$C_3$ and therefore at the input of the interface I a binary combination of normalized voltage values is applied. A change of this binary combination produces an interrupt to the microprocessor μp, which initializes a program sequence. Thereupon the new values are read in and it is tested whether a permissible binary combination is applied or not. If there is a permissible binary combination the direction is determined and a counter is accordingly incremented or decremented as a function of the determined direction. Accordingly the position is indicated. It is also possible to interrogate an internal time counter and to calculate and indicate the velocity or acceleration respectively.

Furtheron the used evaluation electronics and the program of the microprocessor are able to determine reliable the present position if n−1 subsequent and erroneous magnetic field combinations are present and only the $n^{th}$ measuring results in a correct combination of n magnetic field amplitudes. From the last valid and the $n^{th}$ measuring result the direction of movement and the momentarily present position.

According to FIG. 5 the input section of the evaluation circuit according to FIG. 4 is shown again in further details. The shown circuit uses j-Permalloy-measuring resistors $R_1, R_2, \ldots R_j$ as well as a Permalloy-compensation resistor $R_0$. With a bridge circuit at least twice as many Permalloy-resistors must be used. The advantage of a reduced number of Permalloy-resistors is compromised by the arrangement of current sources $I_0$–$I_j$ which are associated to each Permalloy-resistor. However those current sources are electronic standard elements which occupy only a small area on a silicon chip in comparison to high ohmic Permalloy-resistors.

If one assumes perfect operation of amplifiers $DA_1$–$DA_j$ then the output voltage $V_j$ of such an operational amplifier is represented as follows:

$$V_j = \left(1 + \frac{R_{4j}}{R_{3j}}\right) U_j - \frac{R_{4j}}{R_{3j}} U_0$$

$$V_j = \left(1 + \frac{R_{4j}}{R_{3j}}\right) [R_j(1 + \alpha \cdot \Delta T) -$$

$$\delta R(1 + \epsilon \cdot \Delta T) <\sin^2\theta>] \cdot I_j(1 + \gamma\Delta T) -$$

$$\frac{R_{4j}}{R_{3j}} R_0(1 + \alpha \cdot \Delta T) I_0(1 + \gamma\Delta T)$$

within this equation the used terms have the following meaning:

α, ε, γ: temperature coefficiens of the Permalloy-resistors $R_1$ of the alteration of the resistor value δR and of the current sources I.

ΔT: temperature difference with respect to a reference temperature.

The above equation may we written as follows:

$$V_j = -(1 + \nu\Delta T)(1 + \epsilon\Delta T) \frac{R_{4j}}{R_{3j}} \delta R I_j <\sin^2\theta> +$$

$$(1 + \nu\Delta T)(1 + \alpha\Delta T) \frac{R_{4j}}{R_{3j}} \left[\left(1 + \frac{R_{3j}}{R_{4j}}\right) R_j I_j - R_0 I_0\right] -$$

$$(1 + \nu\Delta T)(1 + \epsilon\Delta T) \delta R_j I_j <\sin^2\theta>$$

The last term within the above equation is neglectable small in comparison to the two other terms since this last term is not multiplied by the gain factor ($R_{4j}$ divided by $R_{3j}$).

If additionally the resistors $R_0$, $R_j$ or the currents $I_0$, $I_j$ respectively are choosen in such a way that $$R_0 I_0 = \left(1 + \frac{R_{3j}}{R_{4j}}\right) R_j I_j$$

then the second term also does not contribute to the output voltage $V_j$.

Under these prerequisites the output signal is represented as follows:

$$V_j \approx (1 + \nu\Delta T)(1 + \epsilon\Delta T) \frac{R_{4j}}{R_{3j}} \delta R I_j <\sin^2\theta>$$

From the above equation it may be taken that the magnetoresistive sensitivity is not a function of δR/R but alone of δR. Therefore the film thickness on the silicon substrate may be reduced without influencing the magnetoresistive sensitivity. Therefore the film thickness may be choosen as thin as technical feasible.

The temperature dirft of the output voltage $V_j$ may be reduced to a minimum by an adequate choosing of the temperature coefficient γ of the current sources. If one chooses the temperature coefficient γ of the current sources I in such a way that the temperature coefficient ε of the resistor alteration δR is compensated then the output signal $V_j$ is independent of any temperature influence.

I claim:

1. Apparatus for sensing the position of a movable part comprising n magnetic tracks consisting of individual elements having a length L, with said track being phase-shifted by a value ΔL=L/n with respect to each other and comprising a sensor arranged over said magnetic tracks and including resistors for sensing the magnetic field, whereat the distance d of said resistors from said magnetic tracks does not essentially exceed the length L, characterized in that the number n>1 of the magnetic tracks ($Sp_1$, $Sp_2$, $Sp_3$) is determined by the resolution power of the position sensor ($Sp_1$, $Sp_2$, $Sp_3$; $R_1$, $R_2$, $R_3$) and the required distance d≲L of the sensor from the movable part (T).

2. Apparatus according to claim 1, characterized in that the sensor (S) only senses the central portion with respect to the total length of the magnetic tracks ($Sp_1$, $Sp_2$, $Sp_3$).

3. Apparatus according to claim 1, characterized by Permalloy-resistors ($R_1$, $R_2$, $R_3$) as magnetic field sensing resistors which are deposited by vaporization on a silicon substrate (S) and are associated to each track ($Sp_1$, $Sp_2$, $Sp_3$).

4. Apparatus according to claim 3, characterized in that the Permalloy-resistors ($R_1$, $R_2$, $R_3$) by means of auxiliary magnetic field producing means integrated on said sensor (S) are adjusted to a predetermined working point of their characteristic curves.

5. Apparatus according to claim 4, characterized by a further Permalloy-resistor ($R_0$) having a greater distance from magnetic tracks ($Sp_1$, $Sp_2$, $Sp_3$) for compensation of outer magnetic fields and of temperature influences.

6. Apparatus according to claim 5, characterized in that the output signals of the Permalloy-resistors ($R_1$, $R_2$, $R_3$) sensing the magnetic tracks ($Sp_1$, $Sp_2$, $Sp_3$) each are applied to operational amplifiers ($DA_1$, $DA_2$, $DA_3$) and that a second input of each operational amplifier is fed with the output signal of said further Permalloy-resistor ($R_0$).

7. Apparatus according to claim 6, characterized in that said Permalloy-resistors ($R_1$, $R_2$, $R_3$) and said further Permalloy-resistor ($R_0$) each are fed by current sources ($I_1$, $I_2$, $I_3$, $I_0$) and that the compensation voltage is adjusted according to the following equation:

$$R_0 \cdot I_0 = \left(1 + \frac{R_{3j}}{R_{4j}}\right) R_j I_j$$

whereat $R_{3j}$ and $R_{4j}$ are the resistors in the input and feedback circuit which determine the gain of the associated operational amplifier ($DA_j$).

8. Apparatus according to claim 7, characterized in that the temperature coefficient of the current source is matched to the temperature coefficient of the value variation of the associated Permalloy-resistor.

9. Apparatus according to claim 3, characterized by an evaluation of the magnetic field components normal to the magnetic tracks ($Sp_1$, $Sp_2$, $Sp_3$) by means of the Permalloy-resistors ($R_1$, $R_2$, $R_3$).

10. Apparatus according to claim 3, characterized by an evaluation of the magnetic field components parallel to the magnetic tracks ($Sp_1$, $Sp_2$, $Sp_3$) by means of the Permalloy-resistors ($R_1$, $R_2$, $R_3$).

11. Apparatus according to claim 1 or one of the following claims, characterized in that the sensor (S) is arranged in a housing to provide magnetic shielding.

* * * * *